United States Patent [19]

Cyron

[11] Patent Number: 4,602,001

[45] Date of Patent: Jul. 22, 1986

[54] HIGH-TEMPERATURE EXHAUST GAS CATALYST SUPPORT BODY OF SHEET STEEL WITH A HIGH ALUMINUM CONTENT, AND METHOD FOR MANUFACTURING SAME

[75] Inventor: Theodor Cyron, Bergisch-Gladbach, Fed. Rep. of Germany

[73] Assignee: Interatom GmbH, Bergisch Gladbach, Fed. Rep. of Germany

[21] Appl. No.: 726,419

[22] Filed: Apr. 24, 1985

[30] Foreign Application Priority Data

Apr. 25, 1984 [DE] Fed. Rep. of Germany ....... 3415460
Jan. 28, 1985 [EP] European Pat. Off. ........ 85100839.1

[51] Int. Cl.$^4$ .......................... B01J 21/04; B01J 35/02
[52] U.S. Cl. ..................................... 502/439; 502/527
[58] Field of Search ................................ 502/439, 527

[56] References Cited

U.S. PATENT DOCUMENTS

| | | | |
|---|---|---|---|
| 4,188,309 | 2/1980 | Völker et al. ................... | 502/527 X |
| 4,273,681 | 6/1981 | Nonnenmann .................. | 502/527 X |
| 4,287,097 | 9/1981 | Fratzer et al. ................... | 502/527 X |
| 4,300,956 | 11/1981 | Rosenberger et al. ......... | 502/527 X |

FOREIGN PATENT DOCUMENTS 2903080 8/1979 Fed. Rep. of Germany .
2924592 1/1981 Fed. Rep. of Germany .

*Primary Examiner*—W. J. Shine
*Attorney, Agent, or Firm*—Herbert L. Lerner; Laurence A. Greenberg

[57] ABSTRACT

Exhaust gas catalyst support body, especially of spirally wound or stacked thin corrugated and/or essentially smooth sheets of high temperature-resistant steel, where the contact points of the sheets are connected by a joining technique, characterized by the feature that the structural material has a high aluminum content at least in partial regions and/or in the proximity of the surface and/or the joint connections.

24 Claims, 3 Drawing Figures

HIGH-TEMPERATURE EXHAUST GAS CATALYST SUPPORT BODY OF SHEET STEEL WITH A HIGH ALUMINUM CONTENT, AND METHOD FOR MANUFACTURING SAME

BACKGROUND OF THE INVENTION

1. Field of the Invention

The present invention relates to an exhaust gas catalyst support body, especially of spirally wound or stacked thin corrugated and/or essentially smooth sheets of high-temperature resistant steel where the contact points of the steel are connected by a joining technique.

2. Description of the Prior Art

Such exhaust gas catalyst support bodies, described in No. DE-OS 29 24 592.9, are used with a coating having catalytic action, for the purification of exhaust gases in motor vehicles and are subjected to high mechanical and thermal stresses. It is therefore very difficult to make support bodies with sufficient mechanical strength which last for a long time. For various reasons, especially because of the corrosion resistance, it is desirable that the steel sheet used has a high aluminum content which, however, leads to technical problems because steel with a high aluminum content is difficult to roll and because of the costs arising therefrom. Further problems arise from the joints of the contact points between the individual sheets because these highly stressed places can be weak points because of thermal stresses or erosion, depending on the type of joint.

SUMMARY OF THE INVENTION

An object of the present invention is to provide an exhaust gas catalyst support body which is wound of inexpensively available sheet steel with a low aluminum content which, however, in the completed condition and at least in partial regions and/or at the joint connections and/or at the surfaces, has a higher aluminum content in its structural material than the base material of the starting sheet used. A further object of the invention is to provide a method for manufacturing such an exhaust gas catalyst support body and to make durable joint connections.

With the foregoing and other objects in view there is provided in accordance with the invention an exhaust gas catalyst support body of spirally wound or stacked thin steel sheets with many contact points between the stacked or rolled-up steel sheets and with the sheets joined to each other at the contact points, the combination therewith of, in at least partial regions, of a high aluminum content in the proximity of the surface and the joint connections of the structural material of the catalyst support body.

In accordance with the invention, there is provided a method of manufacturing an exhaust gas catalyst support body of spirally wound or stacked thin steel sheets with many contact points between the stacked or rolled-up steel sheets and with the sheets joined to each other at the contact points, which comprises, spirally winding or stacking steel sheets containing less than one percent aluminum, with at least one steel sheet structured to form many contact points between the stacked or rolled-up steel sheets, providing the wound or stacked steel sheets with a supplemental material of at least ninety percent aluminum, heating the wound or stacked steel sheets containing the supplemental material of aluminum in a protective atmosphere to a temperature above the melting point of aluminum for a sufficient length of time to cause the supplemental aluminum to diffuse into the steel sheets and form an alloy, in at least localized regions in the steel, having an aluminum content above 6% by weight.

Other features which are considered as characteristic for the invention are set forth in the appended claims.

Although the invention is illustrated and described herein as embodied in a high temperature-resistant exhaust gas catalyst support body of sheet steel with a high aluminum content, and method for manufacturing same, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DESCRIPTION OF THE PREFERRED EMBODIMENTS

Figure 1:
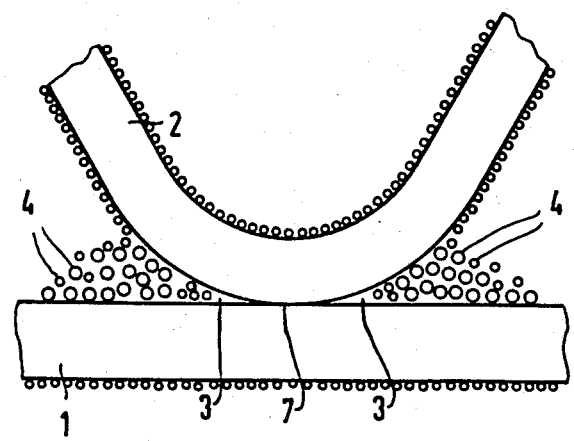
FIG. 1 shows a schematic cross section through a typical contact point between two sheets, a corrugated metal sheet and a smooth metal sheet, to which aluminum granules have been disposed on the metal surfaces and into the gaps in the vicinity of the contact point, prior to being heated.

The present invention relates to an exhaust gas catalyst body and to the manufacture of such an exhaust gas catalyst support body, using as the coating and/or connecting means, supplemental material consisting predominantly of aluminum. Into the gaps in the vicinity of each contact point of exhaust gas catalyst support bodies stacked or wound of metal sheets, aluminum powder is placed which melts at high temperatures and diffuses into the steel sheets. Thereby are generated localized zones of aluminum-rich alloy which are melted and later, upon further diffusion of aluminum, solidify again and make a very strong joint. Additionally, the steel is enriched with aluminum, which is of advantage because of the corrosion resistance. The subsequent enrichment of the base material with aluminum can also be made by the design of the support body of multilayer sheets, of which at least one layer consists predominantly of aluminum foil. Upon later heating, here also the aluminum diffuses into the steel.

In accordance with the invention, the structural material of the exhaust gas catalyst support body has a high aluminum content, at least in partial regions and/or in the proximity of the surface and/or the joint connections. To this end, an exhaust gas catalyst support body is first stacked or wound in one of the known ways from thin sheets, which sheets can be corrugated, smooth or structured in other ways. In this manner, gas-permeable bodies with a large surface and many contact points between the stacked or rolled-up steel sheets are produced. Up to now it has been known that these connecting points are all or partially connected by joints, for instance, soldered by means of a suitable solder. According to the invention, it is now proposed that the joints and/or the structural material have, at least in partial regions, for instance, in the proximity of the surface, a high aluminum content by introducing supplemental material after the deformation into the starting sheets touching each other at their surfaces in the wound condition. Thereby a special kind of connection and increased corrosion resistance are achieved. The advantages of the manufacturing method, according to the invention, of metal support bodies for catalysts will be explained in greater detail in the following, making reference to the drawings.

In one embodiment of the invention, the support body has a base structure with greater wall thickness than otherwise customary. The laminations, of which the body is wound or stacked, advantageously each have a thickness of more than 0.04 mm, preferably between 0.06 and 0.3 mm. The sheets of the base structure with the thicker walls can consist, for this purpose, also of a composite multilayer structure of thinner layers of material.

The use of thicker-walled base structures contributes, under alternating temperature stresses, to increasing the durability of the body and to preventing undesired lengthwise expansion.

The aluminum oxide layer formed on the surface on a metal material with high aluminum content (to which the ceramic coating carrying the catalyst is further applied) is better stabilized by a base structure with thicker walls.

In a method for manufacturing an exhaust gas catalyst support body according to the invention, the exhaust gas catalyst support body is first wound or stacked in known manner from suitably structured sheets. The sheets used are a commercial, for instance, chromium-containing steel sheet without or only with a low aluminum, i.e. an aluminum content by weight of less than one percent. The exhaust gas catalyst support body is provided before, during and/or after the winding or stacking with a supplementary material which substantially consists of aluminum. Subsequently, the exhaust gas catalyst support body provided with supplementary material is heated for some time beyond the melting point of aluminum in a vacuum oven or in a protective atmosphere, for example an atmosphere containing an inert gas such as nitrogen. The term "protective atmosphere" as used hereinafter is intended to include atmospheres under a vacuum. In this manner, the aluminum melts, wets the surfaces and runs, for instance, into the gaps in the vicinity of the contact points and forms connecting bridges such as would also be the case with a solder. In addition, the aluminum starts to diffuse into the steel everywhere, whereby the aluminum content of the steel can be increased markedly afterwards.

In a further embodiment of the invention aluminum powder, which is applied to the surfaces of the support body, is used as the supplemental material. As much aluminum powder as possible is introduced into the gaps in the proximity of the contact points of the sheets, be it by using an adhesive material such as cement and binders, or in some other way. The application of aluminum powder may correspond to the measures known from the application of solder.

In a special embodiment of the method, the exhaust gas catalyst support body is heated to a point at which the lowered melting point of the aluminum-steel alloy which is produced by the aluminum diffusing into the steel and is locally rich in aluminum is reached, and fused joints are obtained in the contact regions. This embodiment is based on the insight that the melting point of an aluminum/steel alloy is lower than that of pure steel. Since the aluminum has the tendency to diffuse into the steel, an alloy with high aluminum content is quickly formed in the vicinity of those points where sufficient aluminum is located; this alloy has a relatively low melting point. If the temperature is chosen high enough, a much more intimate joint can be made in this manner than is the case in soldering.

In a further embodiment, the high temperature is maintained until the aluminum has diffused into the steel everywhere and until so much aluminum has been diffused away from the local aluminum-rich alloy zones into the adjoining structure that the melting point of these places is again above the prevailing temperature, and these zones are solidified thereby. The aluminum has a natural tendency to diffuse from its original location of placement into the steel everywhere. The locally aluminum-rich alloy therefore contains less aluminum again by virtue of the high aluminum diffusion rate as a function of time, whereby the melting point increases. Also after the solidification of the junctions, aluminum continues to diffuse into the steel. Therefore, the melting point of the joints can again be raised appreciably by maintaining a high temperature for a correspondingly long time, and at the same time, the remaining steel is enriched with aluminum for stabilizing its high-temperature corrosion resistance.

This diffusion effect of the aluminum into the steel can be utilized by maintaining the high temperature until the applied aluminum is distributed in the steel substantially uniformly. An exhaust gas catalyst support body treated in this manner has properties substantially improved in so far as high temperature corrosion is concerned because with this method, the aluminum content of the base material, for instance, in the vicinity of the surface can be increased to values higher than 6%, for instance, to 10 or 20% or above, preferably 10 to 25%. Steel materials with similarly high aluminum contents cannot be worked because of their brittleness, and therefor can not be used directly for the manufacture of catalyst support bodies.

In a further embodiment, the materials used as an additive contain, in addition to aluminum, shares of other elements contributing to an improvement of the high-temperature strength or other properties of the catalyst support bodies. For instance, yttrium, zirconium or cerium are mixed with the aluminum used as an additive. Thereby, additional improvements, for example, of the corrosion resistance can be achieved.

In an alternative method for adding additional aluminum, the support body is constructed from multilayer laminations, in which the sheets have at least one layer of aluminum. During the subsequent heating, the aluminum then diffuses, as described, into the steel and thus increases its aluminum content.

It is of particular advantage to build up the support body from three-layer laminations, one aluminum foil always being surrounded by two steel sheet layers. Introducing the supplemental aluminum as a foil between two steel sheets is of advantage in the later use of the support body, since the aluminum-rich layer is located in the interior of the original three-layer sheets and cannot therefore react directly with the oxygen of the environment. The aluminum layer in the interior serves as an aluminum deposit for the aluminum diffusion enrichment of the steel sheet surfaces delineating the composite multilayer structure sheet from the outside. This provides advantages through self-regenerating healing effects of the protective $Al_2O_3$ layer during thermal alternating stress of the support body, in which the outer protective aluminum oxide layer can be damaged. For soldering the sheets at their points of contact, aluminum powder can be used as described above. However, the use of another solder, for instance, nickel solder, may also be employed since the supplemental aluminum is already incorporated by the foil of aluminum between the two sheets.

The described method will be explained in greater detail with the aid of the drawings.

FIG. 1 shows a cross section through the contact point between a smooth metal strip 1 and a corrugated metal strip 2. Alongside such a contact point 7 are laterally narrow gaps 3, into which a supplemental material is placed. In this case, aluminum granules 4 have been placed on the sheet metal surfaces and into the gaps 3 to provide adequate alloying material in the vicinity of the contact point 7.

Figure 2:
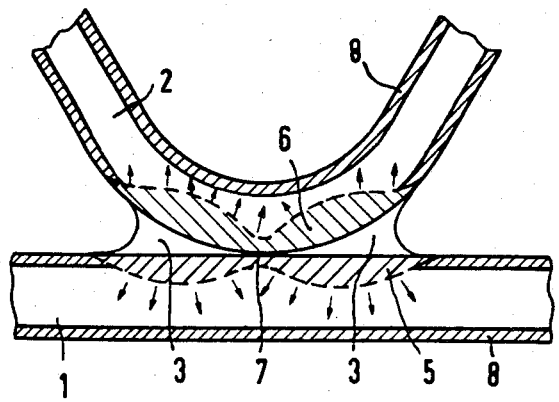
FIG. 2 shows the two sheets of FIG. 1 after the melting of the aluminum with formation of zones of high aluminum content.

As schematically indicated in FIG. 2, the following events occur during the heating.

The aluminum granules 4 on the sheets 1 and 2, and particularly in the gaps 3 melt, wet the surface and fuse together. In the process, the aluminum begins to diffuse immediately into the steel, forming zones 5, 6 and 8 with a high aluminum content in the sheets 1 and 2. These locally aluminum-rich aluminum/steel alloys have a substantially lower melting point than steel with zones 5 and 6 becoming liquid temporarily. Therefore, a very intimate connection is produced in the vicinity of the contact point 7 which, in the ideal case, has approximately the properties of a welded joint since the steel sheets rest directly upon each other prior to making the joint. The aluminum, of course, continues to diffuse at a high temperature, as indicated by arrows into the steel, whereby the melting point of zones 5 and 6 is raised again, and the joint solidifies. The connection created in this manner is extremely strong and the method of making the connection has the additional advantage that the steel is enriched with aluminum, which is of advantage for the corrosion property. It should also be pointed out that the drawing is only schematic and in no way to scale as far as the depth of penetration of the aluminum is concerned.

Figure 3:
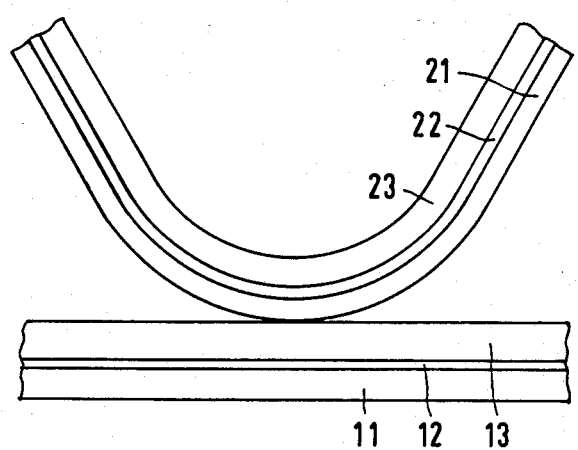
FIG. 3 shows a detail of a cross section through a support body built up of stacked laminations with a layer of aluminum interposed between two layers of sheet metal.

FIG. 3 shows a detail of a cross section through a support body built up from stacked laminations prior to the heating. The smooth as well as the corrugated strip of the support body, otherwise constructed as known per se, consists of three layers. Between two layer of sheet steel (for instance, that known under the trade name "Aluchrom S") there is a thin layer of aluminum or of aluminum base alloy.

The smooth strip therefore consists of a layer 11 of sheet steel, a layer 12 of aluminum foil and a layer 13 of sheet steel again. Similarly, also the corrugated strip is stacked of three layers 21, 22, 23. A body designed in this manner can be soldered, as described above, with aluminum solder or another solder, for instance, nickel solder.

By means of the present invention, a long-life exhaust gas catalyst support body which is particularly high temperature-resistant is produced.

There is claimed:

1. Structure for conversion into an exhaust gas catalyst support body, said structure constructed of spirally wound or stacked thin steel sheets containing less than one percent aluminum with many contact points between the stacked or rolled-up steel sheets for joining the sheets to each other at the contact points, together with a supplemental material having a composition predominately of aluminum disposed in at least partial regions of the sheets to provide a high aluminum content in the proximity of the joint connections and the surface of the structural material of the catalyst support body.

2. Structure for conversion into an exhaust gas catalyst support body according to claim 1, wherein the sheets have a thickness of more than 0.04 mm.

3. Structure for conversion into an exhaust gas catalyst support body according to claim 1, wherein the sheets have a thickness of about 0.06 to 0.30 mm.

4. Structure for conversion into an exhaust catalyst support body according to claim 1, wherein the regions of high aluminum content contain in addition other elements which improve the corrosion resistance of the support body at high temperatures.

5. Structure for conversion into an exhaust gas catalyst support body according to claim 4, wherein the other elements are selected from the group consisting of yttrium, zirconium and cerium.

6. Structure for conversion into an exhaust gas catalyst support body according to claim 1, wherein the structure is wound or stacked from laminations which consist of corrugated sheets and smooth sheets of steel.

7. Structure for conversion into an exhaust gas catalyst support body according to claim 2, wherein the structure is wound or stacked from laminations which consist of corrugated sheets and smooth sheets of steel.

8. Structure for conversion into an exhaust gas catalyst support body according to claim 1, wherein the structure is wound or stacked from laminations which consist of at least two layers with at least one layer having a composition predominantly of aluminum.

9. Structure for conversion into an exhaust gas catalyst support body according to claim 2, wherein the structure is wound or stacked from laminations which consist of at least two layers with at least one layer having a composition predominantly of aluminum.

10. Structure for conversion into an exhaust gas catalyst support body according to claim 1, wherein the structure is wound or stacked of three-layer laminations wherein an aluminum foil is surrounded by two sheet steel layers.

11. Structure for conversion into an exhaust gas catalyst support body according to claim 2, wherein the structure is wound or stacked of three-layer laminations wherein an aluminum foil is surrounded by two sheet steel layers.

12. Method of manufacturing an exhaust gas catalyst support body of spirally wound or stacked thin steel sheets with many contact points between the stacked or rolled-up steel sheets and with the sheets joined to each other at the contact points, which comprises, spirally winding or stacking steel sheets containing less than one percent aluminum, with at least one steel sheet structured to form many contact points between the stacked or rolled-up steel sheets, providing the wound or stacked steel sheets with a supplemental material of at least ninety percent aluminum, heating the wound or stacked steel sheets containing the supplemental material of aluminum in a protective atmosphere to a temperature above the melting point of aluminum for a sufficient length of time to cause the supplemental aluminum to diffuse into the steel sheets and form an alloy, in at least localized regions in the steel in the proximity of the contact points, having an aluminum content above 6% by weight joining the sheets at the contact points.

13. Method according to claim 12, wherein the sheets have a thickness of more than 0.04 mm.

14. Method according to claim 13, wherein the sheets have a thickness of about 0.06 to 0.30 mm.

15. Method according to claim 12, wherein the supplemental material is aluminum powder which is placed after the winding on the surfaces of the support body, and in addition placing aluminum powder in gaps in the vicinity of the contact points of the sheets.

16. Method according to claim 15, wherein heating of the exhaust gas catalyst support body is continued until the melting point of the localized aluminum-rich aluminum/steel alloy is reached and fused connecting points are obtained at the contact points.

17. Method according to claim 16, wherein the high temperature is maintained until the aluminum has diffused into the steel everywhere and until an amount of aluminum has been diffused away from the localized aluminum-rich alloys that the melting point of these points is again above the prevailing temperature and they are therefore solidified.

18. Method according to claim 17, wherein the high temperature is maintained until the incorporated aluminum is distributed in the steel more uniformly, with an aluminum content of 10 to 25%.

19. Method according to claim 12, wherein the introduced supplemental material consisting predominantly of aluminum contains parts of other elements improving the high-temperature corrosion resistance.

20. Method according to claim 19, wherein said other elements are selected from the group consisting of yttrium, zirconium and cerium.

21. Method according to claim 12, wherein the exhaust gas catalyst support body is wound or stacked from laminations which in turn consist of two or more layers where at least one of these layers consists predominantly of aluminum.

22. Method according to claim 12, wherein the exhaust gas catalyst support body is wound or stacked of three-layer lamination, wherein an aluminum foil each is surrounded by two sheet steel layers, and a solder is used for soldering the contact points between the steel sheets of the contact points to be connected.

23. Method according to claim 22, wherein the solder is nickel solder.

24. Method according to claim 22, wherein aluminum powder is used at the contact points to be connected.

* * * * *